(12) United States Patent
Aota et al.

(10) Patent No.: US 8,165,470 B2
(45) Date of Patent: Apr. 24, 2012

(54) WAVELENGTH SELECTING SWITCH

(75) Inventors: Hirofumi Aota, Kawasaki (JP);
Tamotsu Akashi, Kawasaki (JP);
Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 561 days.

(21) Appl. No.: 12/453,172

(22) Filed: Apr. 30, 2009

(65) Prior Publication Data
US 2010/0021167 A1   Jan. 28, 2010

(30) Foreign Application Priority Data

Jul. 24, 2008 (JP) ................................ 2008-190762

(51) Int. Cl.
*H04B 10/00* (2006.01)

(52) U.S. Cl. ................ 398/96; 398/48; 398/45; 398/82; 398/87

(58) Field of Classification Search .............. 398/45–57, 398/79–88; 385/15–19
See application file for complete search history.

(56) References Cited

U.S. PATENT DOCUMENTS

| | | | | |
|---|---|---|---|---|
| 6,268,952 B1 * | 7/2001 | Godil et al. | ..................... | 359/291 |
| 6,501,877 B1 * | 12/2002 | Weverka et al. | ................ | 385/31 |
| 6,657,770 B2 * | 12/2003 | Marom et al. | ................ | 359/290 |
| 6,661,948 B2 * | 12/2003 | Wilde | .............................. | 385/24 |
| 6,707,959 B2 * | 3/2004 | Ducellier et al. | ............... | 385/17 |
| 6,711,319 B2 * | 3/2004 | Hoen | .............................. | 385/18 |
| 6,798,941 B2 * | 9/2004 | Smith et al. | ...................... | 385/18 |
| 6,952,510 B1 * | 10/2005 | Karlsen et al. | .................. | 385/37 |
| 6,956,687 B2 * | 10/2005 | Moon et al. | ................. | 359/223.1 |
| 6,965,710 B2 * | 11/2005 | Makio | ............................. | 385/18 |
| 7,076,146 B2 * | 7/2006 | Sufleta et al. | ................. | 385/140 |
| 7,298,540 B2 * | 11/2007 | Peng et al. | .................... | 359/256 |
| 7,447,399 B2 * | 11/2008 | Aota et al. | ....................... | 385/18 |
| 7,450,801 B2 * | 11/2008 | Doerr et al. | ..................... | 385/33 |
| 7,505,646 B2 * | 3/2009 | Katou et al. | ................... | 385/18 |

(Continued)

FOREIGN PATENT DOCUMENTS

JP   2006-39304   2/2006

(Continued)

OTHER PUBLICATIONS

Patent Abstracts of Japan, Publication No. 2006-039304, published Feb. 9, 2006.

*Primary Examiner* — Agustin Bello
(74) *Attorney, Agent, or Firm* — Staas & Halsey LLP

(57) ABSTRACT

In a wavelength selecting switch, light output from an input port of an input/output optical system is angularly dispersed according to a wavelength thereof, with a spectral element. Then the lights of respective wavelengths are collected by a light collecting optical system and reflected with a corresponding reflecting mirror of a mirror section. The reflected light corresponding to the angle of the reflecting mirror, is input to an output port at an output destination of the input/output optical system. The respective output ports of the input/output optical system each have a lens coupled to an end face of an optical fiber, and the lens has a structure where a focal length of a first region corresponding to inside a variable range of attenuation is different from a focal length of a second region corresponding to outside the variable range. As a result, a change in intensity of output light (coupling efficiency) at the time of an angle change of the reflecting mirror, and cross talk to an adjacent port can be reduced simultaneously.

13 Claims, 13 Drawing Sheets

U.S. PATENT DOCUMENTS

| | | | |
|---|---|---|---|
| 7,574,079 B1 * | 8/2009 | Tremaine | 385/18 |
| 7,636,503 B2 * | 12/2009 | Yamamoto et al. | 385/18 |
| 7,756,368 B2 * | 7/2010 | Garrett et al. | 385/18 |
| 7,796,885 B2 * | 9/2010 | Dress et al. | 398/66 |
| 7,864,423 B2 * | 1/2011 | Koeppen et al. | 359/566 |
| 7,912,331 B1 * | 3/2011 | Yang | 385/39 |
| 2002/0071627 A1 * | 6/2002 | Smith et al. | 385/15 |
| 2002/0093723 A1 * | 7/2002 | Okayama | 359/320 |
| 2002/0191894 A1 * | 12/2002 | Culver et al. | 385/16 |
| 2003/0007148 A1 * | 1/2003 | Moon et al. | 356/328 |
| 2003/0161604 A1 * | 8/2003 | Sufleta et al. | 385/140 |
| 2004/0037493 A1 * | 2/2004 | Lee et al. | 385/18 |
| 2006/0093257 A1 * | 5/2006 | Aota et al. | 385/18 |
| 2006/0140536 A1 * | 6/2006 | Aota et al. | 385/18 |
| 2007/0077003 A1 * | 4/2007 | Aota et al. | 385/18 |

FOREIGN PATENT DOCUMENTS

| | | |
|---|---|---|
| JP | 2006-126678 | 5/2006 |
| JP | 2006-184472 | 7/2006 |
| JP | 2007-101670 | 4/2007 |

* cited by examiner

CONVENTIONAL MICRO LENS (TOP VIEW)

(SIDE VIEW)

(SIDE VIEW)

(SIDE VIEW)

(TOP VIEW)

WAVELENGTH SELECTING SWITCH

CROSS-REFERENCE TO RELATED APPLICATION

This application is based upon and claims the benefit of priority of the prior Japanese Patent Application No. 2008-190762, filed on Jul. 24, 2008, the entire contents of which are incorporated herein by reference.

FIELD

The embodiments discussed herein are related to a wavelength selecting switch that switches an optical path of each wavelength by separating wavelength division multiplexing (WDM) light with a spectral element for each wavelength and then collecting the light on a movable reflecting mirror to reflect the light.

BACKGROUND

Currently, it is well known that in order to accommodate sharply increasing Internet traffic, opticalization of networks with WDM communication as a core is developing rapidly. Current WDM networks are mainly in a point-to-point form. However, it is assumed that these will be developed to ring networks or mesh networks in the near future. At respective nodes constituting such a network, processing such as branching and insertion of an optical signal of an arbitrary wavelength, and optical cross connect (OXC) without involving conversion to electricity is possible, and it is considered that dynamic setting and release of the optical path are performed based on wavelength information.

FIG. 13 is a perspective view illustrating a configuration example of such a conventional wavelength selecting switch arrangeable at nodes of the network. Moreover FIG. 14 and FIG. 15 are a top view and a side view of the wavelength selecting switch in FIG. 13. This conventional wavelength selecting switch includes an input/output optical system 110, a spectral element 120, a light collecting optical system 130, a mirror section 140, and a control section (CONT) 150.

In the input/output optical system 110, a plurality of optical fibers 111 and micro lenses 112 arranged in the vicinity of one end of the respective optical fibers 111, are arranged in a single direction, to constitute one input port Pin and a plurality of output ports Pout. The WDM light provided to the input port Pin is emitted from the one end of the optical fiber 111 and is made into parallel light by the micro lens 112, and is then separated to different angular directions corresponding to the wavelength by the spectral element 120, and the lights of the respective wavelengths are collected at different positions by the light collecting optical system 130. The mirror section 140 having a plurality of reflecting mirrors 141 corresponding to the number of wavelengths is arranged at a collection position of the lights of the respective wavelengths. The respective reflecting mirrors 141 are formed by using, for example, micromachining (Micro Electro Mechanical Systems: MEMS) technology, and are minute mirrors in which an angle of a reflecting surface can be controlled corresponding to a drive signal.

The lights of respective wavelengths that have reached the mirror section 140 are respectively reflected by the corresponding reflecting mirror 141, and are folded back to a direction corresponding to the angle of the respective reflecting surfaces. At this time, the reflecting surfaces of the respective reflecting mirrors 141 are controlled by the control section 150 so as to become a predetermined angle corresponding to the position of any one output port Pout set as an output destination of the input light. As a result the lights of the respective wavelengths folded back by the respective reflecting mirrors 141 sequentially pass through the light collecting optical system 130 and the spectral element 120, and are guided respectively to the target output port Pout. Here the direction in which the light of each wavelength is angularly dispersed by the spectral element 20 is the X direction, the direction in which the input and output ports are arranged is the Y direction, and the direction of the optical axis perpendicular to the X-Y plane is the Z direction.

Such a conventional wavelength selecting switch has a wavelength selecting function for the lights of a plurality of wavelengths included in the input WDM light, that can select the light of an arbitrary wavelength and guide the light to the target output port Pout, by controlling the angle of the reflecting surface of each reflecting mirror 141. Moreover, by inverting the relation of input and output as illustrated in a side view of FIG. 16, it is also possible to select the light provided to a plurality of input ports Pin, according to the wavelength, and guide this to one output port Pout.

Furthermore the conventional wavelength selecting switch also has a function as a variable optical attenuator (VOA) that can arbitrarily attenuate the intensity of light to be output from the output port, by setting the angle of the reflecting mirror 141 shifted from an optimum coupled state. Specifically, as illustrated in FIG. 17, the angle of the reflecting mirror 141 is changed in the Y direction (ports array direction) to thereby change the position of the light which reaches the micro lenses 112 arranged at the end of the output port. Since the angle of the light entering in the end face of the optical fiber 111 through the micro lens 112 changes as illustrated in an enlarged view in FIG. 18 due to the change of the light reaching position, coupling efficiency of the light to the optical fiber 111 changes and the intensity of the light to be output from the output port Pout finally changes.

FIG. 19 is one example in which the angle of the reflecting mirror 141 with the largest coupling efficiency of the light to the optical fiber 111 at a certain output port Pout is designated as 0°, an angle change θ of the reflecting mirror 141 from 0° is plotted on the X axis, and a change in the intensity of the output light is plotted on the Y axis. Because the change in the intensity of the output light corresponds to a change of the coupling efficiency of the light to the optical fiber 111, the graph in FIG. 19 expresses a coupling efficiency function of the output port. It is seen from this graph that as the absolute value of the angle change θ of the reflecting mirror 141 increases, the coupling efficiency decreases.

Such a coupling efficiency function is a function that is mainly determined by the size and the shape of optical beam on the micro lens 112, a focal length of the micro lens 112, a focal length of a lens used for the light collecting optical system 130, a distance between the optical fiber 111 and the micro lens 112, a distance between the micro lens 112 and the light collecting optical system 130, and a distance between the light collecting optical system 130 and the reflecting mirror 141. The coupling efficiency function can also be obtained by theoretical calculation in a simple optical system. However, when the optical system becomes complex and the coupling efficiency function is to be derived accurately including influences of aberration of the lens system and the like, an optical design simulation is generally used.

In the above example, a case in which the angle of the reflecting mirror 141 is changed in the Y direction (ports array direction) has been described. However, the VOA function can also be realized by changing the angle of the reflecting mirror 141 in the X direction (angle distribution direction of respective wavelength lights), for example, as illustrated in FIG. 20. However, when the VOA function is realized by changing the angle of the reflecting mirror 141 in the X direction, it is known that there is the following problem relating to the wavelength (frequency) dependency of the intensity of the output light (for example, refer to Japanese Laid-open Patent Publication Nos. 2006-126678 and 2006-184472).

When the VOA function is realized in the wavelength selecting switch, the output intensity of a plurality of lights having different wavelengths can be attenuated separately for each wavelength. Therefore the transmission band characteristic expressing the wavelength dependency of the intensity of the output light becomes one important characteristic. The graphs illustrated in FIG. 21 and FIG. 22 are examples expressing the transmission band characteristic for a conventional wavelength selecting switch realizing the VOA function, in which a parameter where the frequency is normalized based on an interval between channels of the WDM light adjacent to each other is plotted on the X axis, and a change in the intensity of the output light of one channel is plotted on the Y axis. FIG. 21 illustrates a case in which the angle of the reflecting mirror is changed in the Y direction (ports array direction), and FIG. 22 illustrates a case in which the angle of the reflecting mirror is changed in the X direction (angle distribution direction of respective wavelength lights).

As illustrated in FIG. 21, when the VOA function is realized by changing the angle of the reflecting mirror 141 in the Y direction, even if the intensity of the output light is attenuated by shifting the angle of the reflecting mirror 141 from the optimum coupled state, the transmission band characteristic (graphs formed by round dots and triangular dots in the figure) at the time of attenuation becomes a trapezoidal shape the same as that of the transmission band characteristic (graph formed by squares in the figure) at the time of the optimum coupling. On the other hand, as illustrated in FIG. 22, when the VOA function is realized by changing the angle of the reflecting mirror in the X direction, this gives a characteristic where as the intensity of the output light is attenuated, protruding bumps appear at opposite ends of the transmission band.

Such protruding bumps in the transmission band characteristic are caused by a diffraction phenomenon where the optical beams incident on the reflecting mirror 141 enter into edges of the reflecting mirror 141 in the X direction and are rejected. If such protruding bumps occur, then when an optical amplifier is arranged on a subsequent stage of the wavelength selecting switch, optical components corresponding to the protruding bump portions are also amplified together with other optical components, thereby deteriorating the S/N ratio of respective channels. Accordingly, when the wavelength selecting switch is used to realize the VOA function, a desired control method is one where the angle of the reflecting mirror 141 is changed in the ports array direction.

However, even when the VOA function in the wavelength selecting switch is realized in the above manner by changing the angle of the reflecting mirror 141 in the ports array direction, there are two problems described below. A first problem is that the coupling efficiency of the light to the optical fiber 111 on the output side changes at the time of changing the angle of the reflecting mirror 141. In the reflecting mirror 141 using an MEMS mirror or the like, even if it is attempted to fix and control the reflecting surface at a desired angle, a certain angle change occurs due to external vibrations and changes in ambient temperature. If such an angle change of the reflecting mirror 141 occurs, the position of the light reaching the micro lens 112 at the output port also changes. Therefore, the coupling efficiency of the light to the optical fiber 111 on the output side also changes.

At this time, as illustrated in FIG. 23, a change δ in the intensity of the output light (coupling efficiency) accompanying an angle change b of the reflecting mirror 141 becomes noticeable at the time of setting attenuation (θa), as compared to at the time of setting optimum coupling (θ0). Moreover, as illustrated in FIG. 24, when an inclination of the coupling efficiency function is gradual, even if there is the angle change b of the reflecting mirror as described above, the change δ in the coupling efficiency decreases as compared to the case illustrated in FIG. 23. That is to say, from a standpoint of the change in the coupling efficiency of the light to the optical fiber 111 on the output side at the time of angle change of the reflecting mirror 141, the case where the inclination of the coupling efficiency function is relatively gradual is more advantageous.

A second problem is cross talk to an adjacent output port. In the wavelength selecting switch, the space in the ports array direction is limited due to restrictions on size and the like, and intervals between respective ports may be limited. Here, referring to a port of an output destination of the light as a signal port, and a port adjacent to the signal port as an adjacent port, if an interval between the signal port and the adjacent port is narrow, a part of the light guided to the signal port also leaks to the adjacent port, thereby causing cross talk.

FIG. 25 and FIG. 26 explain the cross talk to an adjacent port by using the coupling efficiency function. In the example of FIG. 25, when a case is considered where attenuation of the angle of the reflecting mirror 141 is set so that the intensity of the output light at the signal port becomes −15 dB with respect to that at the time of setting the optimum coupling, then as illustrated by the thick arrow line in the figure, the light leaks to the adjacent port by about −32 dB. Moreover the example of FIG. 26 illustrates a case where the inclination of the coupling efficiency function is sharper than in the case of FIG. 25, and in this case, even if the attenuation is set to −15 dB as above, and the port interval is the same, the amount of cross talk to the adjacent port becomes −50 dB or below. That is, the case where the inclination of the coupling efficiency function is sharp is advantageous from the standpoint of cross talk to the adjacent port.

As described above, in the conventional wavelength selecting switch, the two problems of the change in coupling efficiency of light to the fiber 111 on the output side at the time of the angle change of the reflecting mirror 141, and the occurrence of cross talk to the adjacent port, have a tradeoff relation with respect to sharpness of the inclination of the coupling efficiency function. Therefore, there is a problem that these cannot be reduced simultaneously.

SUMMARY

According to an aspect of the invention, a wavelength selecting switch includes: an input/output optical system in which at least one input port and a plurality of output ports are arranged in a first direction; a spectral element that angularly disperses light output from the input port of the input/output optical system in a second direction different from the first direction according to a wavelength thereof; a light collecting optical system that collects the light output from the spectral element; a mirror section having a plurality of reflecting mirrors in which angle-variable reflecting surfaces are respectively arranged at light collecting positions of the lights of respective wavelengths collected by the light collecting optical system; and a control section that controls an angle of the respective reflecting mirrors so that the lights of respective wavelengths reflected by the respective reflecting mirrors of the mirror section are coupled to an output port, which is set as an output destination, of the input/output optical system via the light collecting optical system and the spectral element, and shifts the angle of the respective reflecting mirrors from the optimum coupled state, thereby enabling adjustment of the intensity of the output light according to a preset variable range of attenuation. Moreover, the respective output ports of the input/output optical system each have a lens that couples reflected lights input from the reflecting mirrors via the light collecting optical system and the spectral element, to an end face of the optical fiber. The respective lenses have a structure where a focal length of a first region on a lens surface, to which the reflected light is input when the reflecting mirror is controlled to an angle corresponding to inside the variable range of the attenuation, is different from a focal length of a second region on a lens surface, to which the reflected light is input when the reflecting mirror is controlled to an angle corresponding to outside the variable range of the attenuation.

In such a wavelength selecting switch, after the light output from the input port of the input/output optical system is angularly dispersed in the second direction according to the wavelength thereof by the spectral element, the lights of respective wavelengths pass through the light collecting optical system and are collected on the corresponding reflecting mirror in the mirror section. The angle of the reflecting surface of each reflecting mirror is controlled according to a position of the output port set as the output destination of incident light, and the attenuation provided to the output light, and the light reflected by the reflecting mirror is input to the corresponding output port in the input/output optical system via the light collecting optical system and the spectral element, and coupled to the end face of the optical fiber via the lens. At this time, when the angle of the reflecting mirror is set in the variable range of the attenuation, the reflected light is input to the first region of the lens, and coupled to the end face of the optical fiber according to the focal length of the first region. On the other hand, when the angle of the reflecting mirror is set outside of the variable range of the attenuation, the reflected light is input to the second region of the lens, and collected according to the focal length of the second region. However, a light collecting position thereof is shifted from the end face of the fiber, since the focal length of the second region is different from the focal length of the first region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereunder is a description of an embodiment of the present invention, with reference to the accompanying drawings.

Figure 1:
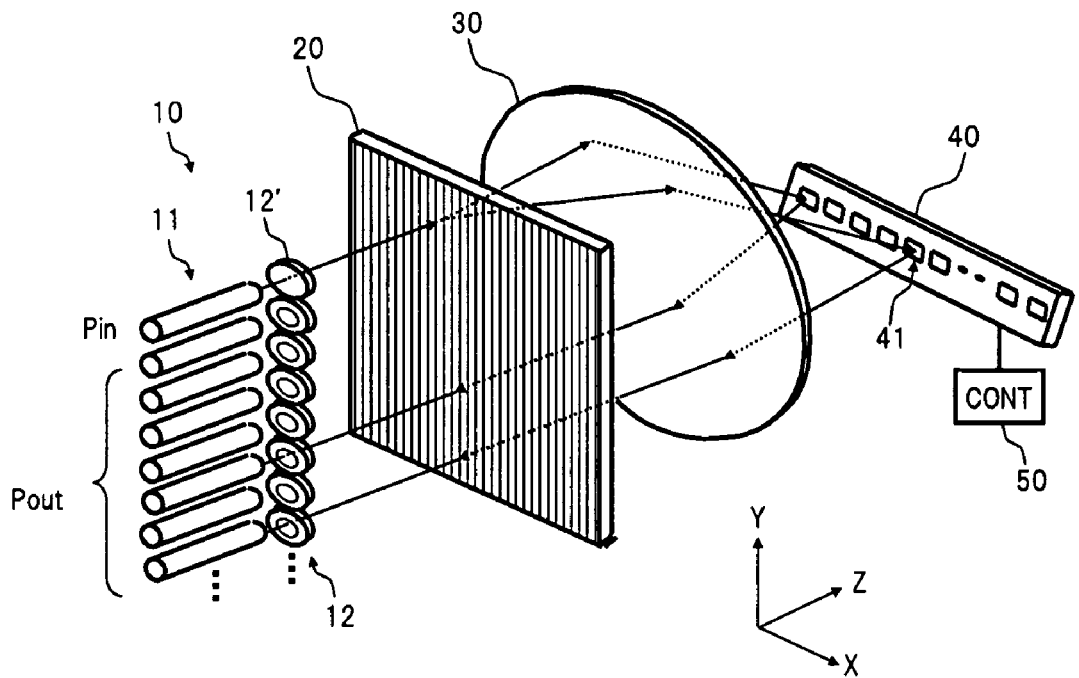
FIG. 1 is a perspective view illustrating an overall configuration in an embodiment of the wavelength selecting switch.

FIG. 1 is a perspective view illustrating an overall configuration in an embodiment of a wavelength selecting switch according to the present invention. Moreover FIG. 2 is an enlarged view near an output port in FIG. 1.

Figure 2:
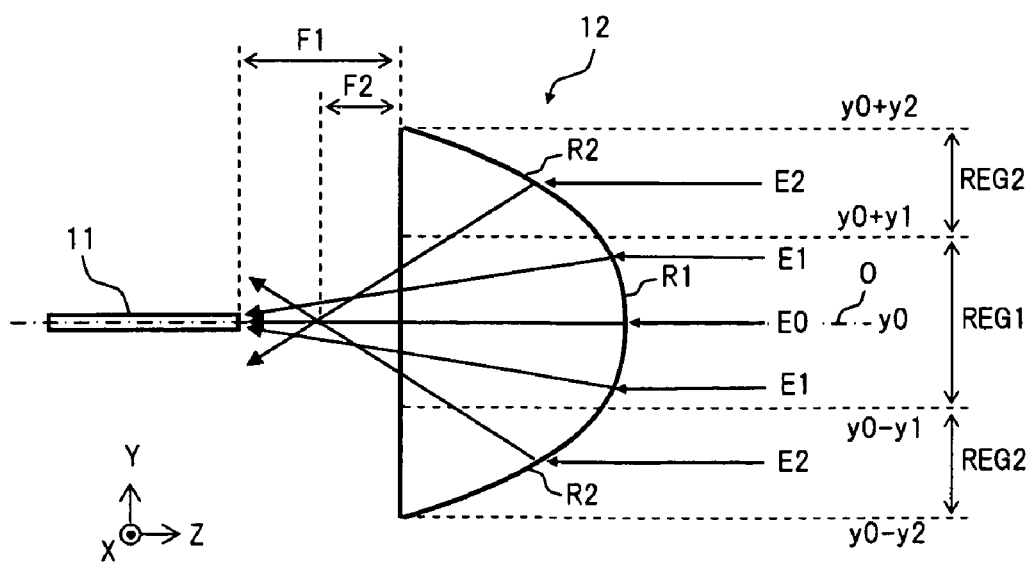
FIG. 2 is an enlarged view near an output port in FIG. 1.

In FIG. 1 and FIG. 2, the wavelength selecting switch in the embodiment includes: an input/output optical system 10 in which, for example, one input port Pin and a plurality of output ports Pout are arranged in a first direction; a spectral element 20 that separates light output from the input port Pin of the input/output optical system 10 according to a wavelength thereof and angularly disperses the light in a second direction different from the first direction; a light collecting optical system 30 that collects lights of the respective wavelengths angularly dispersed by the spectral element 20; a mirror section 40 in which a plurality of reflecting mirrors 41 are arranged corresponding to a light collecting position of the lights of the respective wavelengths collected by the light collecting optical system 30; and a control section (CONT) 50 that controls an angle of reflecting surfaces of the respective reflecting mirrors 41. Here also, as in the aforementioned case of FIG. 13, the direction in which the light of each wavelength is angularly dispersed by the spectral element 20 is the X direction, the direction in which the input and output ports are arranged is the Y direction, and the direction of the optical axis perpendicular to the X-Y plane is the Z direction.

Figure 13:
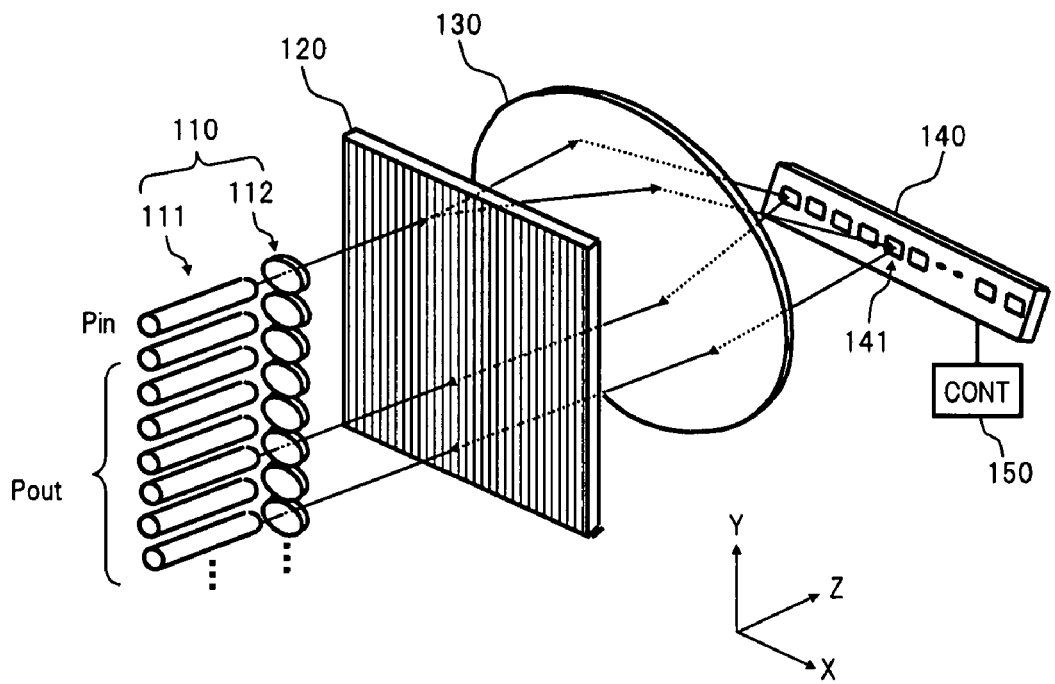
FIG. 13 is a perspective view of a configuration example of the conventional wavelength selecting switch.
Figure 14:
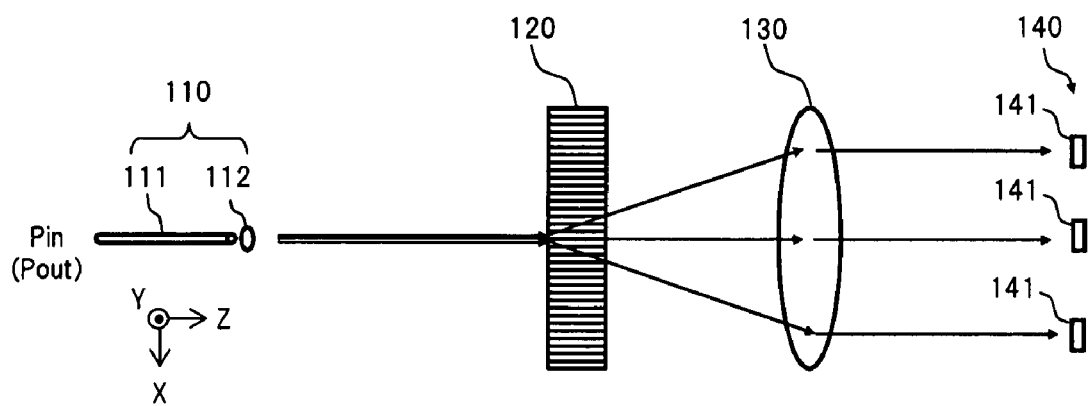
FIG. 14 is a top view of the wavelength selecting switch in FIG. 13.
Figure 15:
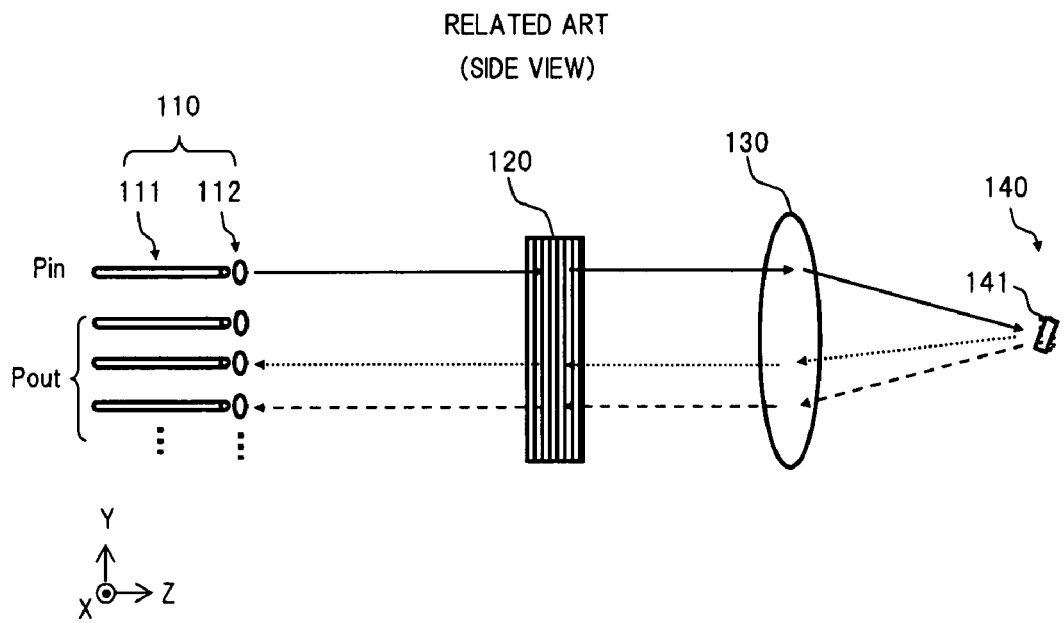
FIG. 15 is a side view of the wavelength selecting switch in FIG. 13.
Figure 16:
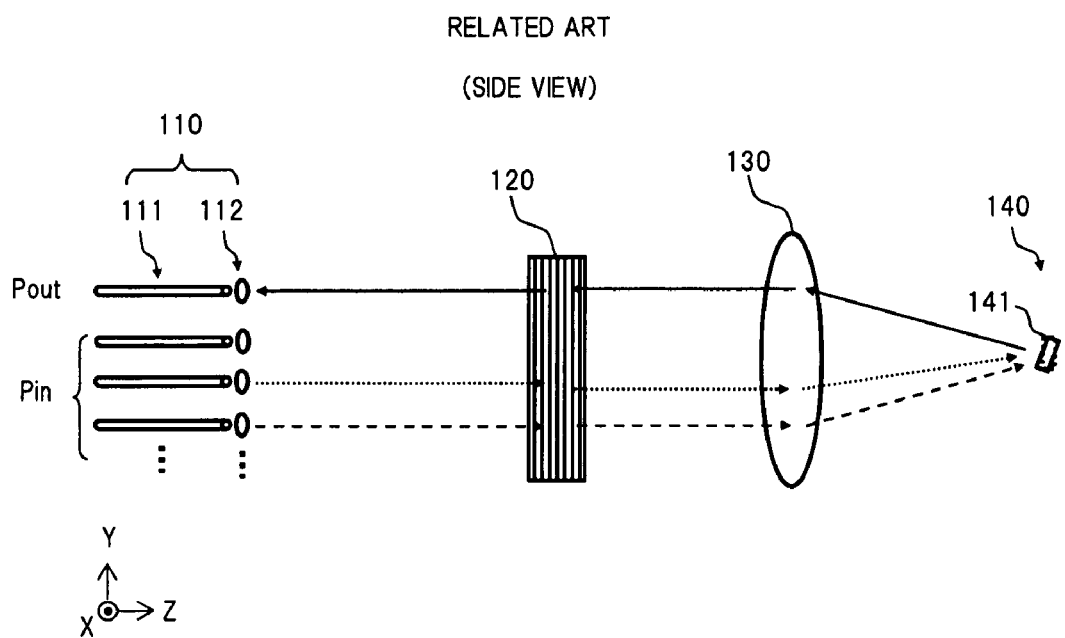
FIG. 16 is a side view of another configuration example of the conventional wavelength selecting switch.
Figure 17:
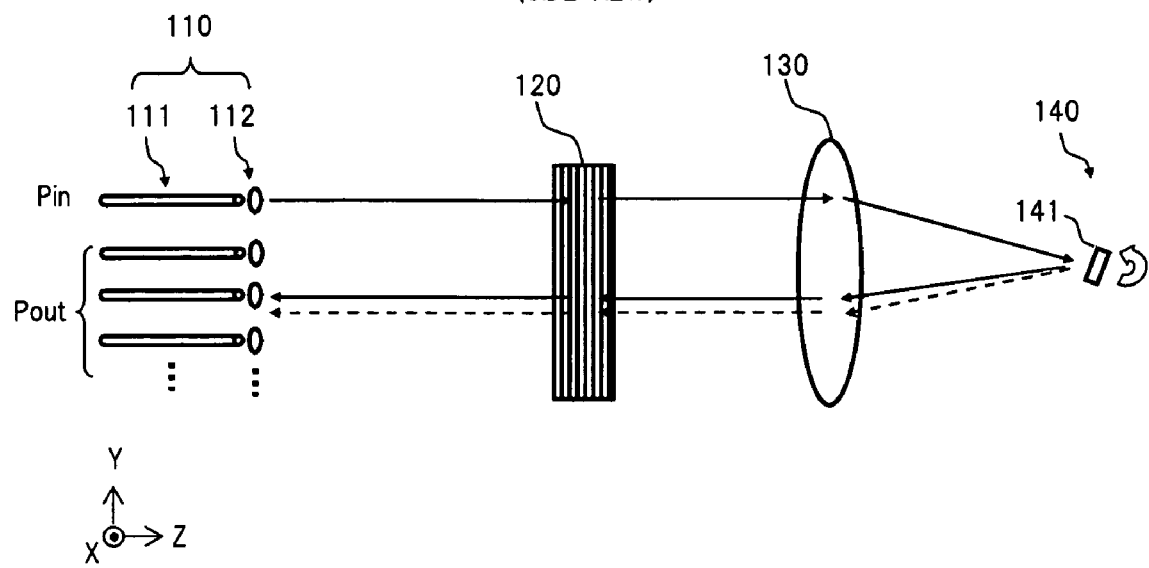
FIG. 17 is a side view when an angle of a reflecting mirror is changed in a Y direction to realize a VOA function, in the conventional wavelength selecting switch.
Figure 18:
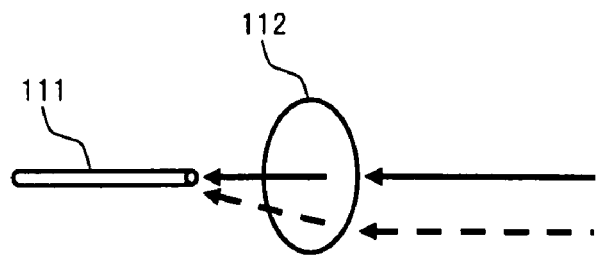
FIG. 18 is an enlarged view near the output port in FIG. 17.

A point where the configuration of the wavelength selecting switch is different from the conventional configuration illustrated in FIG. 13 is that, for a micro lens 12 corresponding to each output port Pout of the input/output optical system 10, a focal length F1 of a first region (REG1 illustrated in FIG. 2) centered on the optical axis O of the lens is designed to be different from a focal length F2 of a second region (REG2 illustrated in FIG. 2) located at a periphery of the lens. The optical axis O of the lens coincides with a central axis of an optical fiber, with an end face that is coupled with transmitted light of the micro lens 12. The configuration of parts other than the micro lens 12 is basically the same as that of the conventional wavelength selecting switch.

The first region REG1 corresponds to an incident position of the light for when within a variable range of attenuation with respect to output light preset according to a specification or the like for when the VOA function is realized by the wavelength selecting switch. That is to say, as described above, when the VOA function of the wavelength selecting switch is realized by setting the angle of the reflecting mirror 41 to be shifted from the optimum coupled state in the Y direction (array direction of the input and output ports), the first region REG1 is a range spanning the incident positions of the light for when the attenuation (absolute value) becomes an upper limit (maximum value) of the variable range centered on the optical axis of light E0 incident to the micro lens 12 at the time of optimum coupling, at which the attenuation (absolute value) becomes the minimum. In FIG. 2, for the Y direction, the position of the optical axis of light E0 is denoted by y0, and the incident position of the light at the time of maximum attenuation is denoted by y0±y1. The second region REG2 corresponds to the incident position of the light for when the attenuation is outside the variable range, and is a range spanning from a boundary (y0±y1) of the first region REG1 to the periphery of the lens surface (y0±y2).

An arbitrary lens capable of collimating the light emitted from the optical fiber 11 can be used as a micro lens 12' corresponding to the input port Pin of the input/output optical system 10. In the example of FIG. 1, a configuration using a single focus lens the same as in the conventional wavelength selecting switch, as the micro lens 12' on the input side is illustrated. However, a double focus lens the same as on the output side can be used also on the input side. Moreover, here a configuration example in which the input port Pin is only one is illustrated. However, this may also be a configuration where a plurality of input ports are provided, and the light provided to the respective input ports is selected according to wavelength and guided to a desired output port.

The spectral element 20 is for angularly dispersing the light emitted from the optical fiber 11 at the input port Pin and collimated by the micro lens 12', to the X direction according to the wavelength, and a diffraction grating is generally used. The diffraction grating is an optical element in which a plurality of parallel grooves are engraved periodically on a glass substrate. By using a diffraction phenomenon of the light, it gives an exit angle different for each wavelength with respect to the light including a plurality of wavelength components entering at a required angle. Wavelength separation of the WDM light becomes possible due to a spectral function of the diffraction grating, and by inverting the relation between the input and output, the light provided at an incident angle different for each wavelength is wavelength-multiplexed, thereby enabling the light to be emitted at a required angle. In FIG. 1, one example using a transmission diffraction grating as the spectral element 20 is illustrated. However, a reflecting diffraction grating can also be used.

The light collecting optical system 30 is for focusing the light of the respective wavelengths angularly dispersed by the spectral element 20, onto the corresponding reflecting mirror 41 in the mirror section 40, and also focusing the light reflected by the respective reflecting mirrors 40 onto the spectral element 20. A transmission or reflecting collective lens is generally used.

In the mirror section 40, a plurality of reflecting mirrors 41 corresponding to the number of the maximum wavelengths of the light that can be input to the wavelength selecting switch are arranged in the X direction. The respective reflecting mirrors 41 are formed for example by using micromachining (MEMS) technology, and are minute mirrors in which the angle of the reflecting surface can be controlled at least about the axis in the X direction.

The control section 50 controls the angle of the reflecting surfaces of the respective reflecting mirrors 41 so that the respective reflected lights are guided to the output port set as the output destination of the input/output optical system 10, via the light collecting optical system 30 and the spectral element 20. Moreover, by shifting the angle of the respective reflecting surfaces from the optimum coupled state, the intensity of the output light can be adjusted according to the variable range of the attenuation, thereby realizing the VOA function.

Next is a description of an operation of the wavelength selecting switch of the embodiment.

Figure 3:
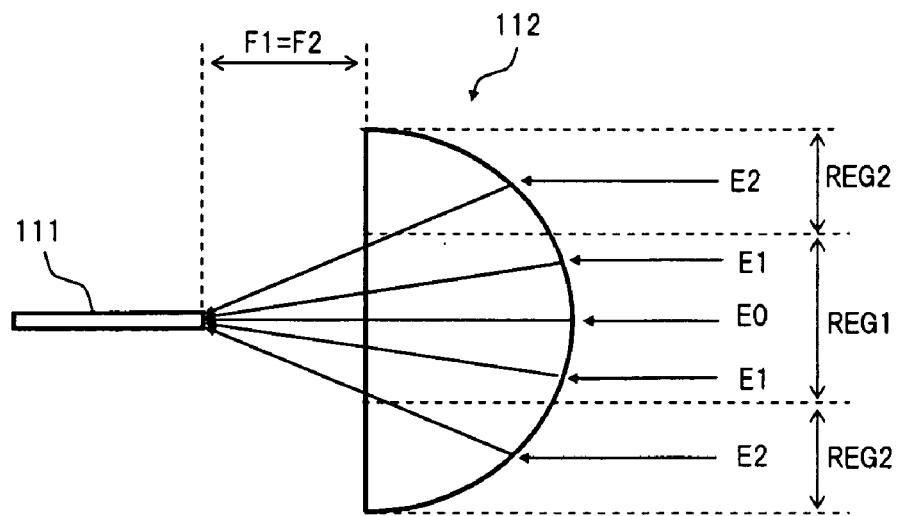
FIG. 3 is an enlarged view near the output port of a conventional wavelength selecting switch.

At first a cause producing the first and second problems in the conventional wavelength selecting switch described above will be explained in detail. In the conventional wavelength selecting switch, as illustrated in FIG. 3, the micro lens 112 at the output port is a normal spherical lens, in which the focal length F2 of the second region REG2 corresponding to outside the variable range of the attenuation with respect to the output light coincides with the focal length F1 of the first region REG1 corresponding to inside the variable range.

Here as a specific example for the variable range of the attenuation with respect to the output light, when the maximum attenuation (absolute value) obtained as the VOA function in the wavelength selecting switch is set to 15 dB, then inside the variable range for when expressing the attenuation by a negative decibel value is a range spanning from 0 dB (at the time of setting the optimum coupling) to −15 dB (at the time of setting the maximum attenuation), and outside the variable range is a range in which the value of the attenuation is smaller than −15 dB. However, the variable range of the attenuation in the present invention is not limited to this example.

Figure 19:
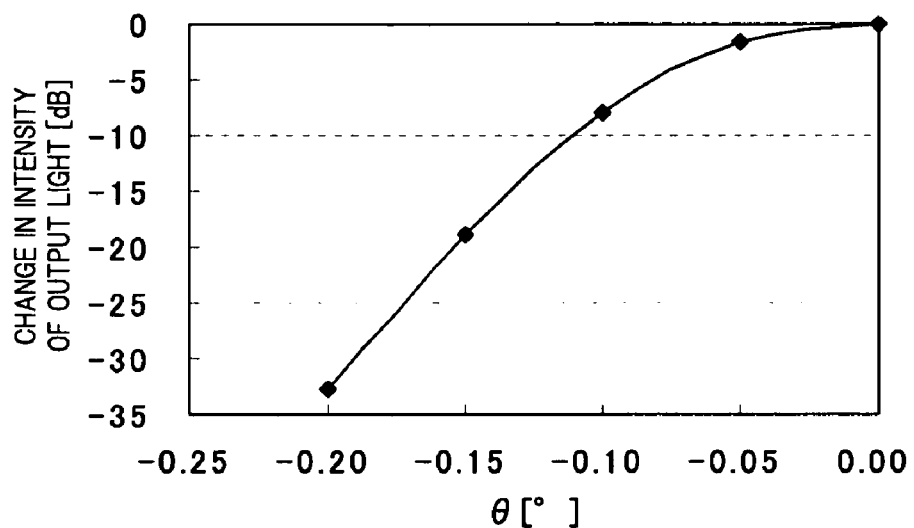
FIG. 19 illustrates one example of the coupling efficiency function in the conventional wavelength selecting switch.
Figure 20:
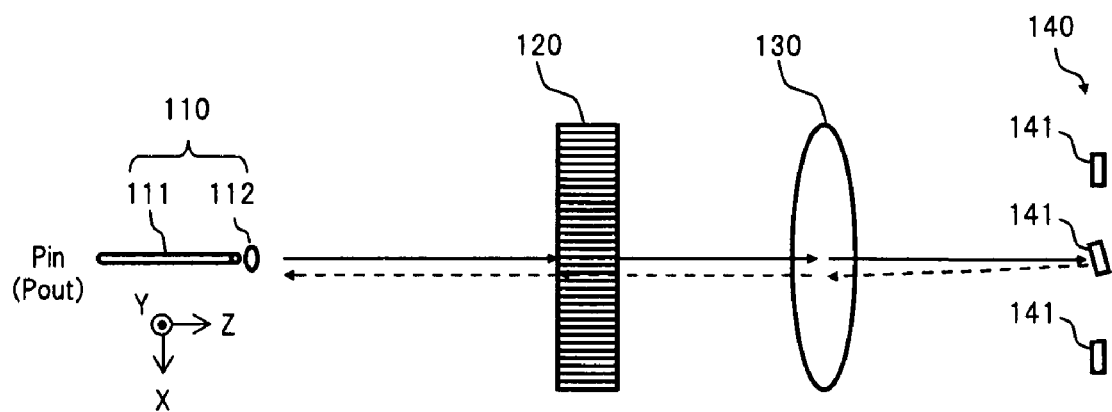
FIG. 20 is a top view when an angle of the reflecting mirror is changed in an X direction to realize the VOA function, in the conventional wavelength selecting switch.
Figure 21:
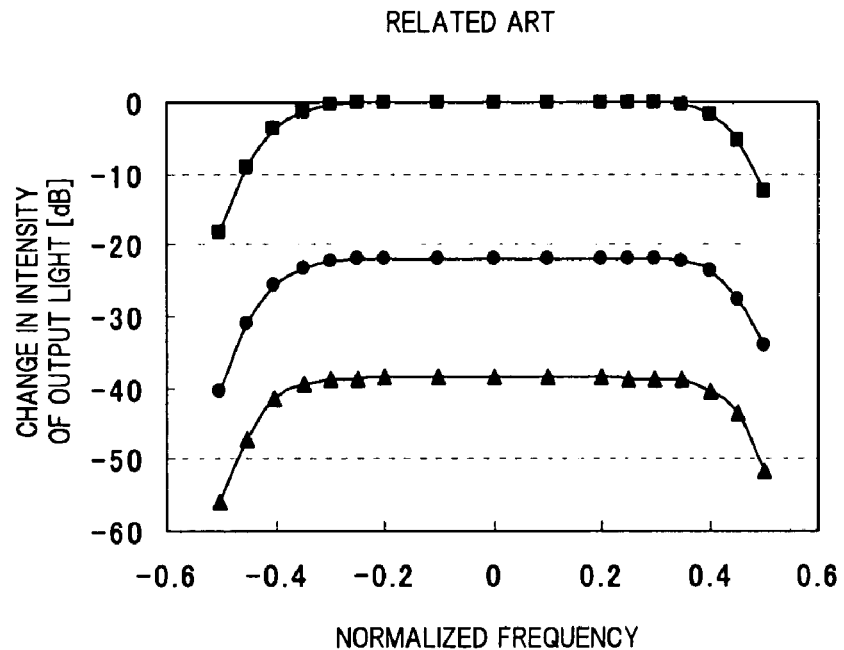
FIG. 21 illustrates one example of a transmission band characteristic when the angle of the reflecting mirror is changed in the Y direction, in the conventional wavelength selecting switch.
Figure 22:
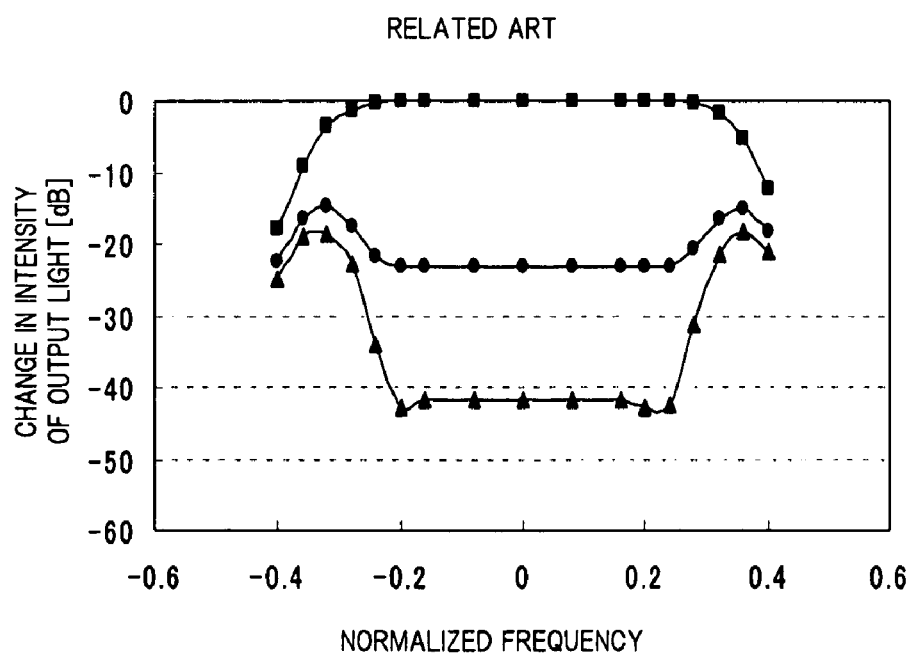
FIG. 22 illustrates one example of the transmission band characteristic when the angle of the reflecting mirror is changed in the X direction, in the conventional wavelength selecting switch.
Figure 23:
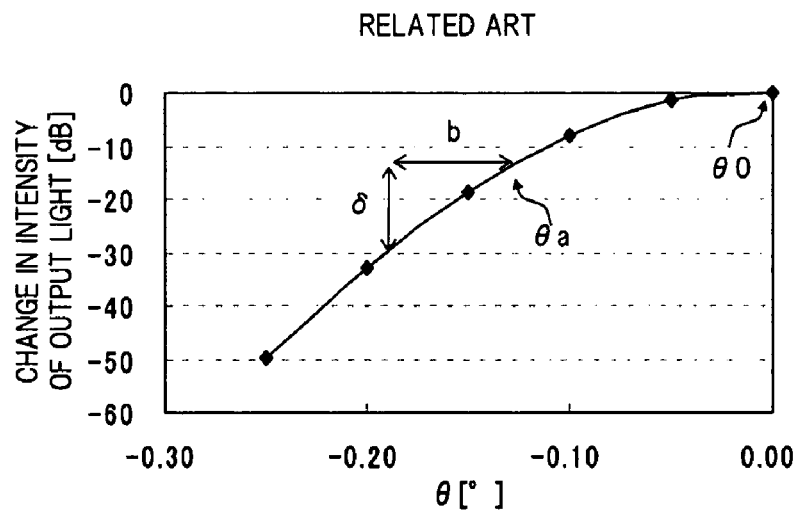
FIG. 23 is a diagram for explaining a first problem in the conventional wavelength selecting switch.
Figure 24:
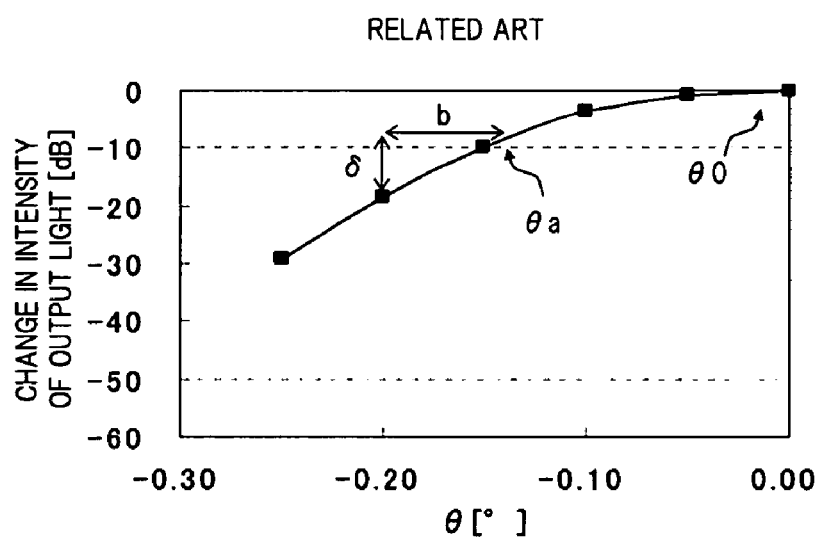
FIG. 24 is another diagram for explaining the first problem in the conventional wavelength selecting switch.
Figure 25:
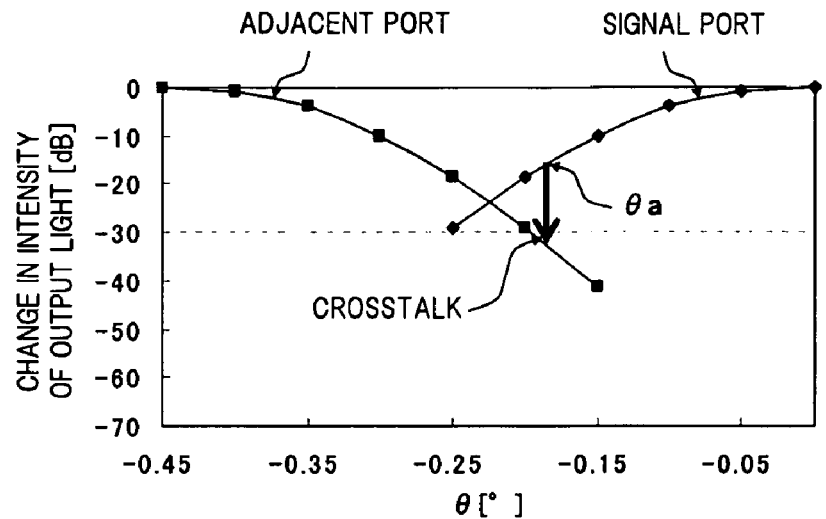
FIG. 25 is a diagram for explaining a second problem in the conventional wavelength selecting switch.
Figure 26:
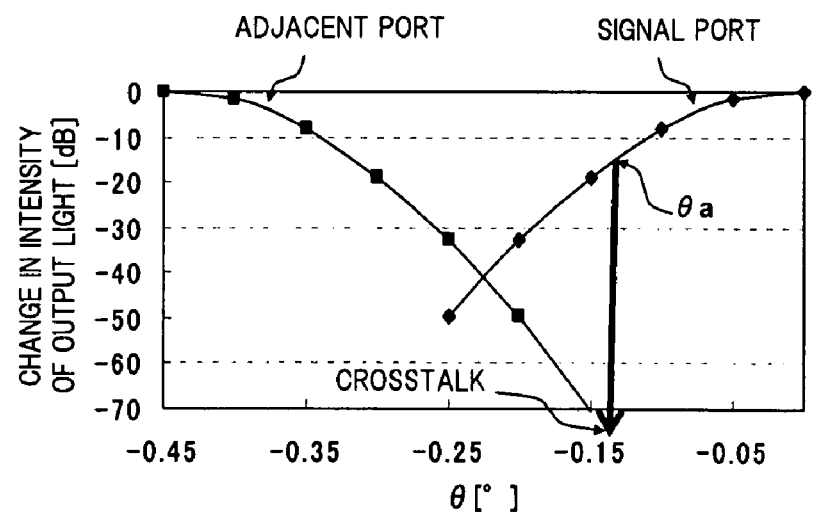
FIG. 26 is another diagram for explaining the second problem in the conventional wavelength selecting switch.

In the conventional configuration using the above normal spherical lens, when the angle of the reflecting mirror is changed to change the incident position of the light on the micro lens 112 at the output port, if there is no aberration in the micro lens 112, only the incident angle of the light collected on the end face of the optical fiber 111 changes according to the angle setting of the reflecting mirror, thereby causing a change in the coupling efficiency of the light to the optical fiber 111. This change in the coupling efficiency in the conventional configuration follows a function having a shape approximate to a quadratic function as illustrated in the aforementioned FIG. 19. That is to say, the coupling efficiency function in the conventional configuration becomes relatively gradual even outside the variable range, if a rate of change (inclination in the graph) of the coupling efficiency with respect to the angle change of the reflecting mirror is gradual inside the variable range of the attenuation. Therefore, it is difficult to solve the above-described problems simultaneously, that is, to reduce the change in the coupling efficiency of the light to the optical fiber 111 on the output side at the time of changing the angle of the reflecting mirror, and the crosstalk to the adjacent port simultaneously.

Therefore in the wavelength selecting switch in the embodiment, the micro lens 12 corresponding to the respective output ports is designed by applying the double focus structure in which the focal length F2 of the second region REG2 corresponding to outside the variable range of the attenuation is different from the focal length F1 of the first region REG1 corresponding to inside the variable range, to thereby solve the above problems.

Figure 4:
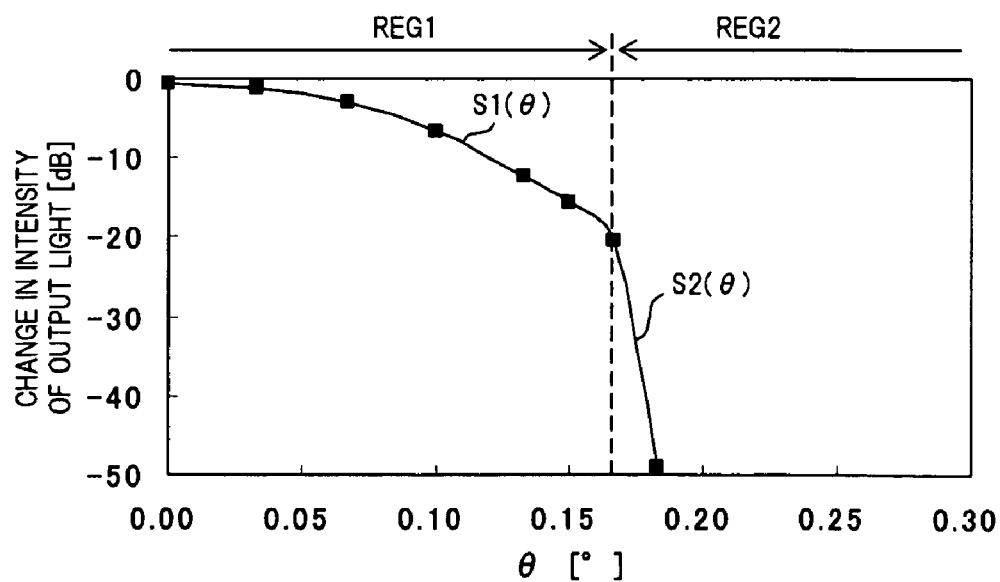
FIG. 4 illustrates one example of a coupling efficiency function in the wavelength selecting switch.

In this configuration in which the micro lens 12 having the double focus structure is applied to the respective output ports, a coupling efficiency function $S(\theta)$ expressing a change in the intensity of the output light for when the angle of the reflecting mirror 41 is changed by $\theta$ from the optimum coupled state has a different functional form, for example as illustrated in FIG. 4, according to whether the angle change $\theta$ has a value corresponding to inside the variable range (the first region REG1) of the attenuation, or a value corresponding to outside the variable range (the second region REG2). That is to say, the coupling efficiency function $S(\theta)$ of each output port in the wavelength selecting switch can be expressed by the following equation (1), using two functions $S1(\theta)$ and $S2\theta)$ having a different form.

When $\theta$ has a value corresponding to REG1; $S(\theta) = S1(\theta)$

When $\theta$ has a value corresponding to REG2; $S(\theta) = S2(\theta)$ (1)

In the coupling efficiency function $S(\theta)$ in the above equation (1), a change tolerance D (upper limit) of the intensity of the output light (coupling efficiency) and a crosstalk tolerance E (upper limit) to the adjacent port, at the time of the angle change of the reflecting mirror are set according to a working condition or the like of the optical system to which the wavelength selecting switch is applied, thereby enabling to set $S1(\theta)$ and $S2(\theta)$ simultaneously satisfying the relation in equation (2) described below.

$S1(B+b) - S1(B) \leq D$ $S2(A-B-b) \leq E$ (2)

The respective parameters of A, B, and b defined in relation to the angle change $\theta$ of the reflecting mirror in equation (2) have a relation illustrated in FIG. 7 and FIG. 8 indicating a simulation result described later. That is to say, parameter A indicates a value obtained by converting a distance between the signal port, which is an output destination port of the light of the desired wavelength, and an adjacent port positioned adjacent to the signal port, to an angle based on the angle setting of the reflecting mirror for at the time of the optimum coupling with respect to the respective ports. Moreover parameter B indicates an angle of the reflecting mirror for when the maximum attenuation inside the variable range is provided to the output light to the signal port, designating the angle of the reflecting mirror as 0° at the time of the optimum coupling with respect to the signal port. Furthermore parameter b indicates an amount of angle change of the reflecting mirror caused by external vibrations, or changes in ambient temperature, or the like.

Accordingly, a change of the intensity of the output light (coupling efficiency) to the signal port at the time of changing the angle of the reflecting mirror can be expressed by $\delta = S1(B+b) - S1(B)$, and $S1(\theta)$ is set so that the change $\delta$ satisfies a condition of equal to or lower than the tolerance D. Moreover, crosstalk generation to the adjacent port can be expressed by $XT = S2(A-B-b)$, and $S2(\theta)$ is set so that the crosstalk generation XT satisfies a condition of equal to or lower than a tolerance E. Then the focal length F1 of the first region REG1 and the focal length F2 of the second region REG2 of the micro lens 12 are respectively obtained based on $S1(\theta)$ and $S2(\theta)$, and the structure of the micro lens 12 is determined.

By applying the micro lens 12 having the above double focus structure to the respective output ports Pout, the intensity of the output light (coupling efficiency) changes depending on the change in the incident angle of the light entering to the optical fiber 11 from the micro lens 12 inside the variable range of the attenuation, as in the conventional structure. On the other hand, outside the variable range of the attenuation, the focal length F2 of the second region REG2 of the micro lens 12 is different from the focal length F1 of the first region REG1. Therefore, not only a change in the incident angle of the light but also a shift of the incident position occur, thereby increasing the change in the intensity of the output light. That is to say, the inclination of the coupling efficiency function $S(\theta)$ is relatively gradual inside the variable range of the attenuation, but is relatively sharp outside the variable range.

As one means for realizing the micro lens 12 having such a double focus structure, in the embodiment, a radius of curvature R1 corresponding to the first region REG1 on the lens surface, and a radius of curvature R2 corresponding to the second region REG2 are made different (refer to FIG. 2). A specific example of the micro lens is given below, and the operation and effect of the wavelength selecting switch will be explained by using a calculation result in a simulation thereof.

Figure 5:
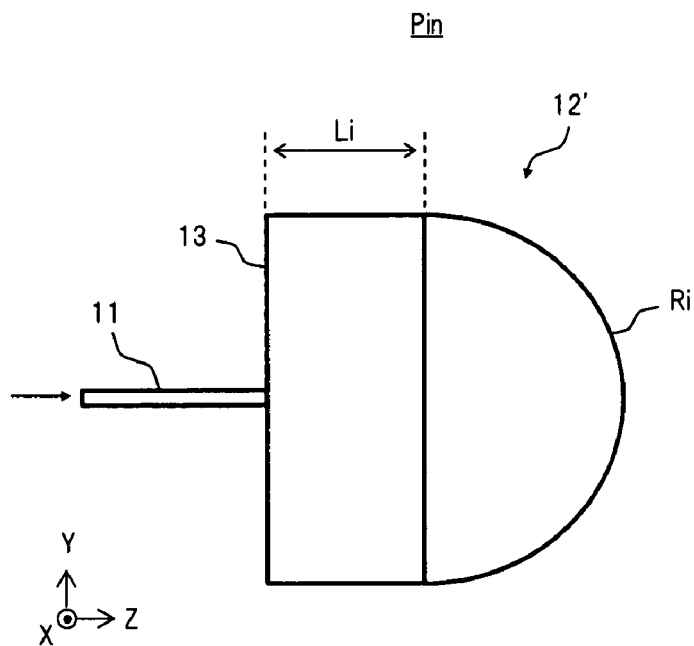
FIG. 5 illustrates a specific example of a micro lens on an input side of the wavelength selecting switch.

Here it is assumed that a normal hemispherical lens illustrated for example in FIG. 5 is used as the micro lens 12' at the input port Pin, the radius of curvature of the hemispherical lens is Ri, and the material of the lens is synthetic quartz. Moreover the optical fiber 11 and the micro lens 12' are fixed via a spacer 13 made of synthetic quartz, and the thickness of the spacer 13 is assumed to be Li. At this time, it is also assumed that Li=2.26 Ri is established as a condition for collimating the light emitted from the optical fiber 11 through the micro lens 12'.

Figure 6:
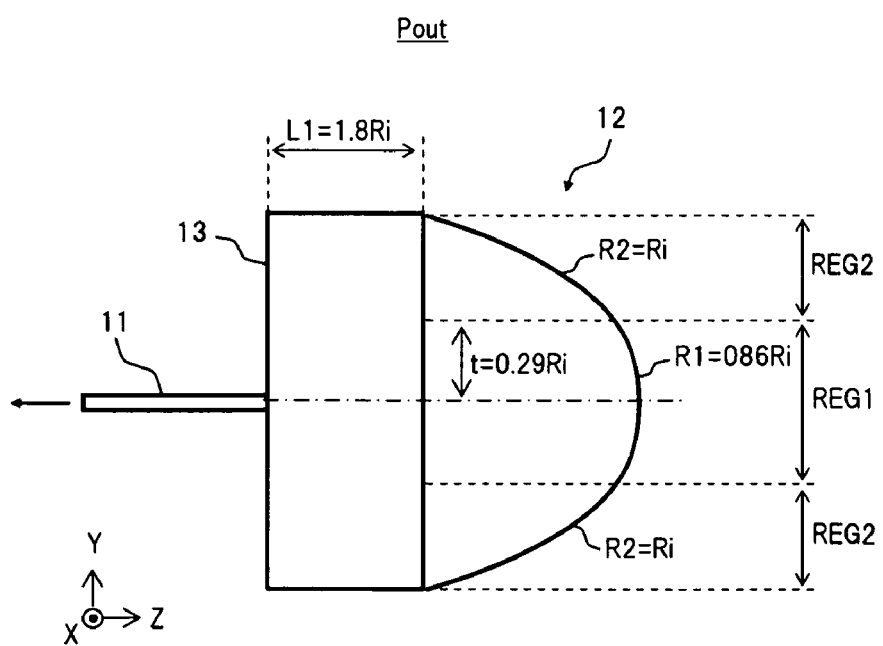
FIG. 6 illustrates of a specific example of a micro lens on an output side of the wavelength selecting switch.

With respect to the above micro lens 12' on the input side, for example, as illustrated in FIG. 6, it is assumed that a double focus lens in which the radius of curvature R1 in the first region REG1 is 0.86 Ri and the radius of curvature R2 in the second region REG2 is Ri, is used as the micro lens 12 at the output port Pout. The boundary between the first and second regions REG1 and REG2 in the micro lens 12 is positioned such that a distance t from the center of the lens is 0.29 Ri. Moreover, the thickness L1 of the spacer 13 between the optical fiber 11 and the micro lens 12 is 1.8 Ri, and the materials of the micro lens 12 and the spacer 13 are synthetic quartz.

Figure 7:
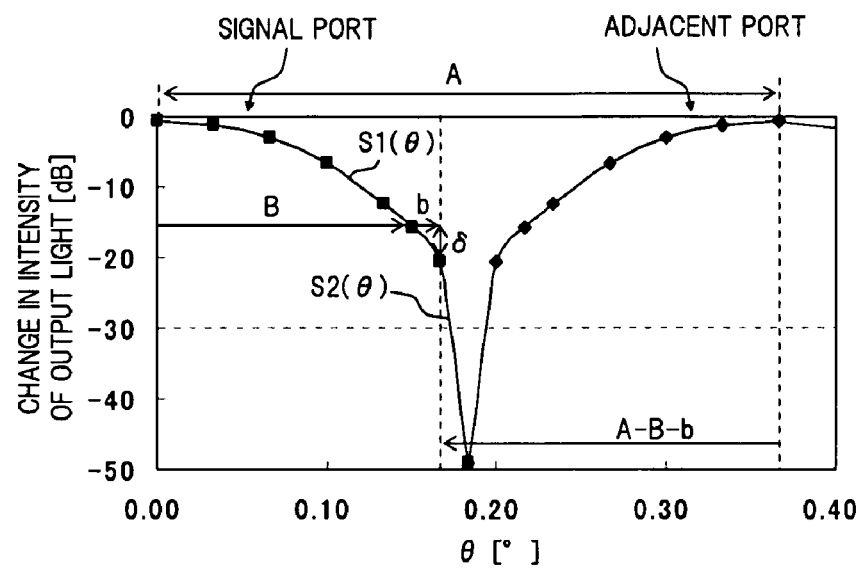
FIG. 7 illustrates a result of calculation of the coupling efficiency function of a signal port and an adjacent port for the wavelength selecting switch.

FIG. 7 illustrates a calculation result of the coupling efficiency function $S(\theta)$ when the above micro lenses 12 and 12' are used. Here calculation is performed by using A=0.380, B=0.150, b=0.01°, D=0.4 dB, and E=−40 dB as the values of the respective parameters in the aforementioned equation (2). Moreover FIG. 8 illustrates the same calculation result as a comparison with the conventional configuration, for when a structure parameter of the micro lens on the output side is coincided with the structure parameter of the micro lens 12' on the input side illustrated in FIG. 5.

Figure 8:
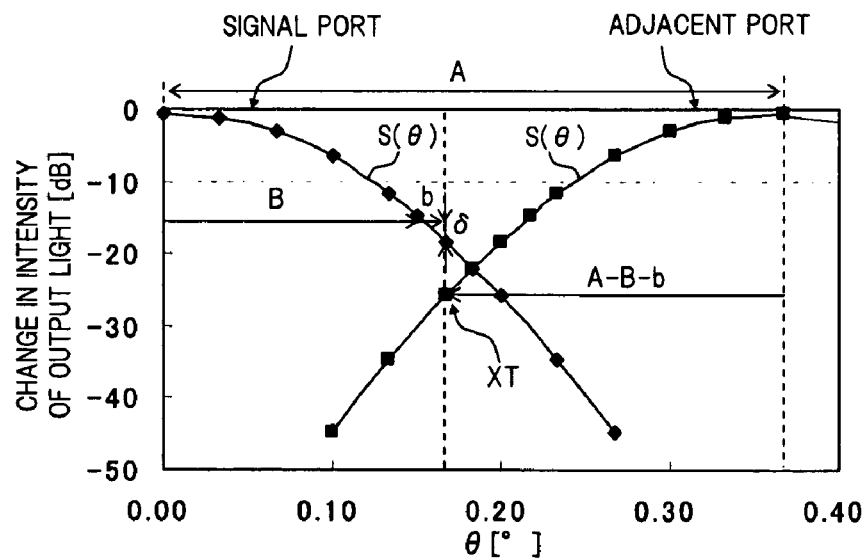
FIG. 8 illustrates a result of calculation of the coupling efficiency function of the signal port and the adjacent port for a conventional wavelength selecting switch.

At first, in the calculation result in FIG. 8, in the conventional configuration, when there is a change corresponding to the parameter b (=0.01°) in the angle of the reflecting mirror in a state where the angle change $\theta$ of the reflecting mirror is set to the parameter B (=0.15°), that is, the angle of the reflecting mirror is set so that the maximum attenuation inside the variable range is provided to the output light to the signal port, the change $\delta$ in the intensity of the output light due to the angle change of the reflecting mirror becomes 0.31 dB, which is equal to or lower than the tolerance D (=0.4 dB). However, the crosstalk generation XT to the adjacent port in this state is −30, which exceeds the tolerance E (=−40 dB).

On the other hand, in the calculation result in FIG. 7, in the wavelength selecting switch, the change $\delta$ in the intensity of the output light due to the angle change of the reflecting mirror under the same condition as above is 0.35 dB, which satisfies the condition of equal to or lower than the tolerance D (=0.4 dB), and the crosstalk generation to the adjacent port becomes sufficiently lower than −50 dB and simultaneously satisfies the condition of equal to or lower than the tolerance E (=−40 dB). Therefore, according to the wavelength selecting switch, the change in the coupling efficiency of the light to the optical fiber 11 on the output side at the time of changing the angle of the reflecting mirror 41, and the crosstalk to the adjacent port, can be simultaneously reduced.

Figure 9:
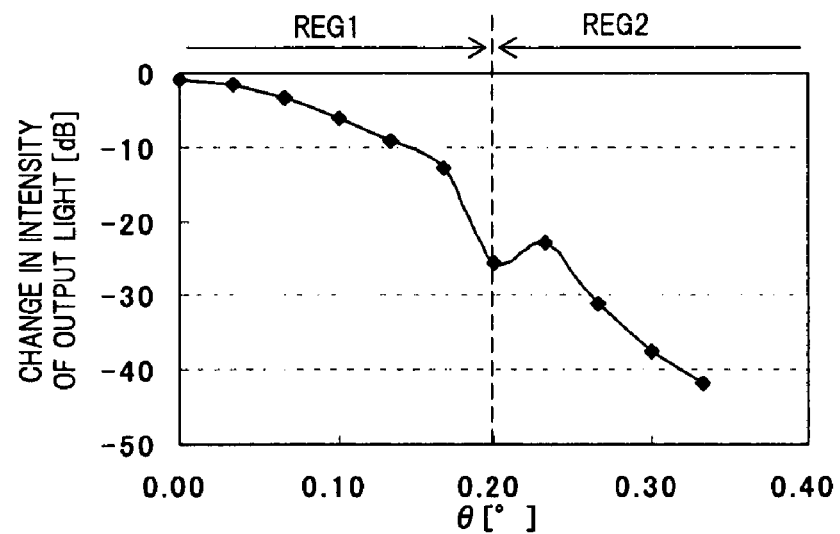
FIG. 9 illustrates one example of the coupling efficiency function when a difference in a focal length between first and second regions increases beyond necessity, associated with the wavelength selecting switch.

The above-described effect can be obtained basically by varying the focal length F2 of the second region REG2 from the focal length F1 of the first region REG1 in the micro lenses 12 at the respective output ports Pout. However, if the difference between the focal length F1 and the focal length F2 increases beyond necessity, then for example, as illustrated in FIG. 9, a bump (an increase in the coupling efficiency) may occur in a part of the coupling efficiency function outside the variable range of the attenuation, and hence special care is required.

Such a bump in the coupling efficiency function occurs due to spreading of the optical beams that have passed through the second region REG2. That is to say, if the focal length F2 is shorter than the focal length F1 beyond necessity, the optical beams that have passed through the second region REG2 reach the optical fiber 11 in a state of being focused between the micro lens 12 and the optical fiber 11 and then spread, and a part thereof is coupled to the end face of the optical fiber 11. Moreover if the focal length F2 is longer than the focal length F1 beyond necessity, the optical beams that have passed through the second region REG2 reach the optical fiber 11 in a state of being spread before being focused, and a part thereof is coupled to the end face of the optical fiber 11.

Such a bump in the coupling efficiency function occurs not only in the signal port but also similarly in the coupling efficiency function of the adjacent port. Therefore it may affect reduction of the crosstalk to the adjacent port. However, such a condition can be avoided by satisfying the relation in equation (2) described above, at the time of designing the respective focal lengths F1 and F2 of the micro lens 12.

Next is a description of a modified example of the above-described embodiment.

Figure 10:
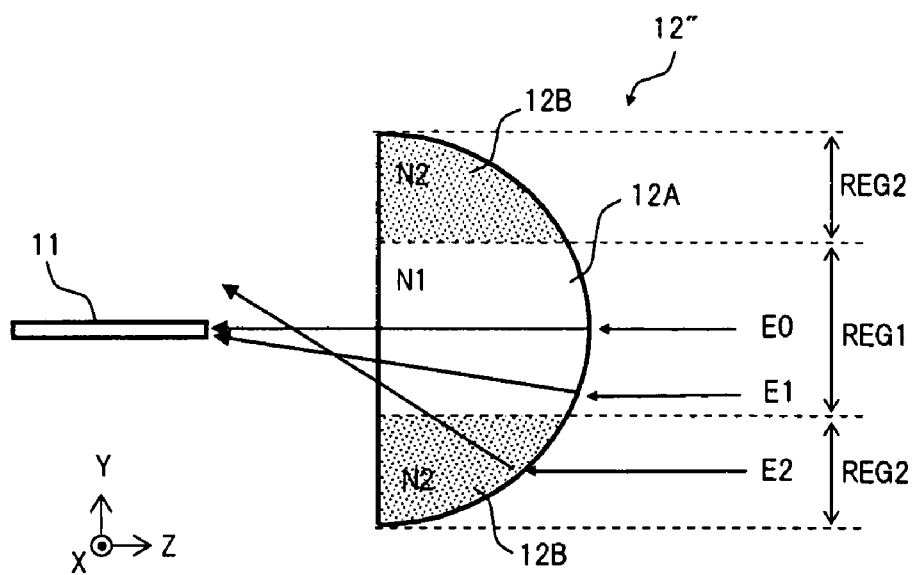
FIG. 10 illustrates a modified example of the micro lens on the output side of the wavelength selecting switch.

In the above-described embodiment, one example of the lens structure in which the radii of curvature R1 and R2 of the first and second regions REG1 and REG2 are varied in order to make the micro lens 12 at each output port Pout have a double focus structure is illustrated. However, for example as illustrated in FIG. 10, the micro lens 12" having the double focus structure can be realized by setting the radius of curvature of the lens surface uniform as in the conventional art, and making a refractive index N1 of a lens part 12A corresponding to the first region REG1, and a refractive index N2 of a lens part 13B corresponding to the second region REG2, different.

Figure 11:
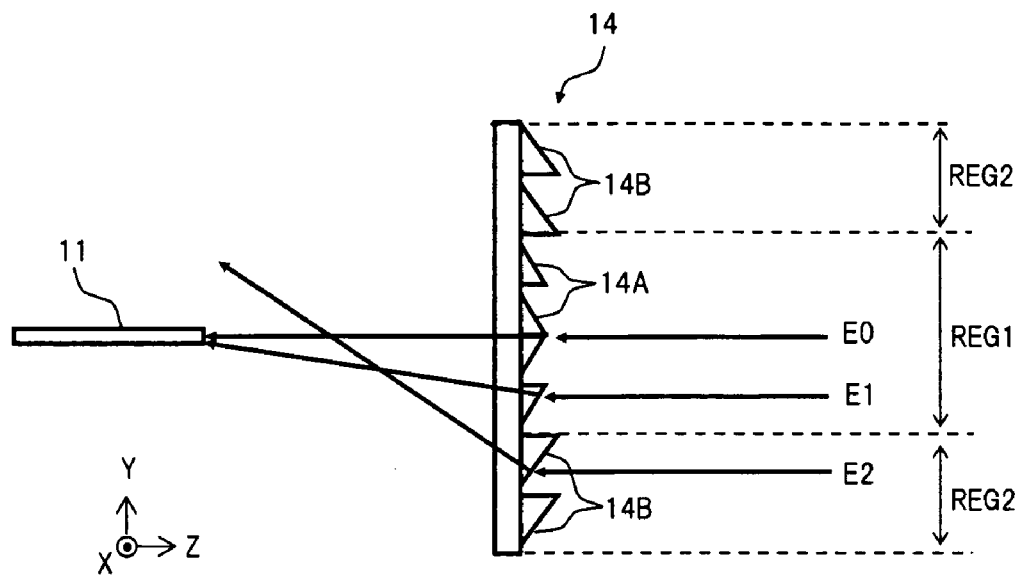
FIG. 11 illustrates a modified example in which a Fresnel lens is applied to the output port of the wavelength selecting switch.

Moreover, for example as illustrated in FIG. 11, a Fresnel lens 14 can be used for the respective output ports Pout. The Fresnel lens 14 realizes the double focus structure by making a shape (including the size) or groove interval of a sawtooth wave-type groove 14A corresponding to the first region REG1, and a shape (including the size) or groove interval of a sawtooth wave-type groove 14B corresponding to the second region REG2, different.

Also for the wavelength selecting switch using the micro lens 12" in which the refractive indexes N1 and N2 of the first and second regions REG1 and REG2 are different from each other, or the Fresnel lens 14 in which the sawtooth wave-type grooves 14A and 14B in the first and second regions REG1 and REG2 are different from each other, the change in the coupling efficiency of the light to the optical fiber 11 on the output side at the time of changing the angle of the reflecting mirror 41, and the crosstalk to the adjacent port can be simultaneously reduced by the same operation principle as for the case of the above-described embodiment.

In the embodiment and the modified example described above, a case where the lens having the double focus structure is applied to the respective output ports has been described. However, in the wavelength selecting switch, it is important for the lens at the respective output ports, that the focal length of the second region corresponding to outside the variable range of the attenuation is different from the focal length of the first region corresponding to inside the variable range. Therefore, a progressive lens having three or more superimposed focal points can be applied to the respective output ports.

Figure 12:
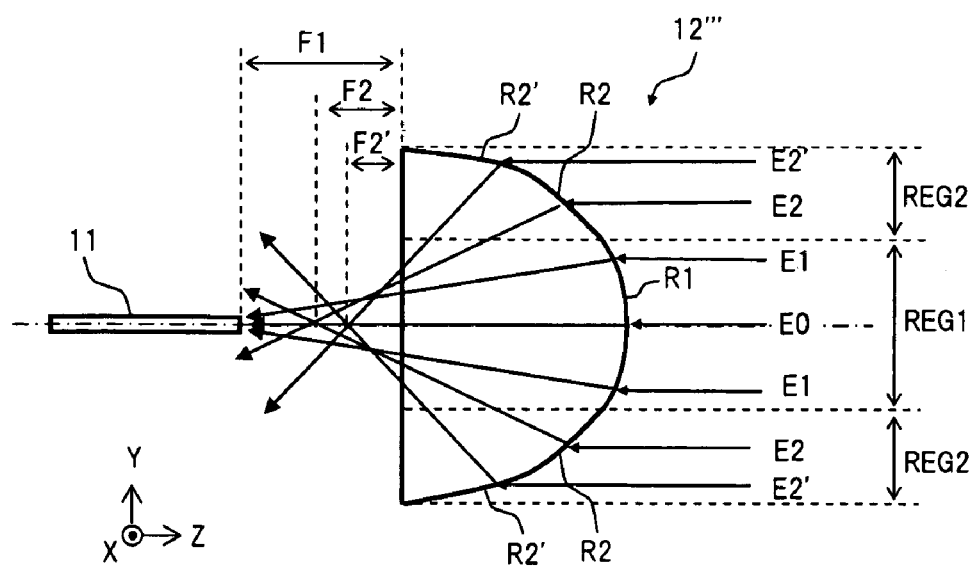
FIG. 12 illustrates a modified example in which a micro lens having superimposed focal lengths of the second region is applied to the output port of the wavelength selecting switch.

That is to say, for the first region corresponding to inside the variable range of the attenuation, it is necessary to exclude a change in the incident angle of the light due to adjustment of the angle of the reflecting mirror, and couple the output light to the end face of the optical fiber most efficiently. Therefore it is desired to equalize the focal lengths of the first region. On the other hand, for the second region corresponding to outside the variable range, since the coupling efficiency is intentionally decreased contrary to the necessity described above, then basically there is no problem even if the lens having superimposed focal points is used. Therefore, for example as illustrated in FIG. 12, even if a progressive lens 12'" in which the focal lengths of the second region are superimposed as F2 and F2', assuming that these are different from the focal length F1 of the first region, is used for the respective output ports, the same operation and effect as for the case of the embodiment described above can be obtained, and the degree of freedom in designing the lens can be improved.

For the micro lens as illustrated in FIG. 2 or FIG. 10, as a means for realizing such a progressive lens having three or more superimposed focal points, there is; a structure in which the radius of curvature of the lens surface changes two or more times in the second region (refer to FIG. 12), a structure in which the lens surface in the second region is a free-form surface, and a structure in which the refractive index in the second region changes two or more times or continuously. Moreover for the Fresnel lens as illustrated in FIG. 11, there is a structure where the shape (including the size) of the sawtooth wave-type groove in the second region or the interval of the groove is changed two or more times or continuously.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wavelength selecting switch comprising:
   an input/output optical system in which at least one input port and a plurality of output ports are arranged in a first direction;
   a spectral element that angularly disperses light output from the input port of the input/output optical system in a second direction different from the first direction according to a wavelength thereof;
   a light collecting optical system that collects the light output from the spectral element;
   a mirror section having a plurality of reflecting mirrors in which angle-variable reflecting surfaces are respectively arranged at light collecting positions of the lights of respective wavelengths collected by the light collecting optical system; and
   a control section that controls an angle of the respective reflecting mirrors so that the lights of respective wavelengths reflected by the respective reflecting mirrors of the mirror section are coupled to an output port, which is set as an output destination, of the input/output optical system via the light collecting optical system and the spectral element, and shifts the angle of the respective reflecting mirrors from an optimum coupled state, thereby enabling adjustment of the intensity of the output light according to a preset variable range of attenuation, wherein
   the respective output ports of the input/output optical system each have a lens that couples reflected lights input from the reflecting mirrors via the light collecting optical system and the spectral element to an end face of the optical fiber, and
   the respective lenses have a structure where a focal length of a first region on a lens surface, to which the reflected light is input when the reflecting mirror is controlled to an angle corresponding to inside the variable range of the attenuation, is different from a focal length of a second region on a lens surface, to which the reflected light is input when the reflecting mirror is controlled to an angle corresponding to outside the variable range of the attenuation.

2. A wavelength selecting switch according to claim 1, wherein
   an angle change of the reflecting mirror from the optimum coupled state is denoted by $\theta$, and when the angle change $\theta$ has a value corresponding to inside the variable range of the attenuation, a change in intensity of the output light coupled to the output port is denoted by a first coupling efficiency function $S1(\theta)$, and when the angle change $\theta$ has a value corresponding to outside the variable range of the attenuation, a change in intensity of the output light coupled to the output port is denoted by a second coupling efficiency function $S2(\theta)$; and
   when a value obtained by converting a distance between adjacent output ports of the input/output optical system to an angle based on an angle setting of the reflecting mirror in the optimum coupled state is denoted by A, an angle change of the reflecting mirror at the time of providing a maximum attenuation in the variable range of the attenuation to the output light is denoted by B, an amount of angle change of the reflecting mirror due to external influences is denoted by b, a change tolerance of the intensity of the output light at the time of the angle change of the reflecting mirror is denoted by D, and a crosstalk tolerance to the adjacent port at the time of the angle change of the reflecting mirror is denoted by E,
   the focal length of the first region and the focal length of the second region of the lens are set so that the first and second coupling efficiency functions $S1(\theta)$ and $S2(\theta)$ satisfy a relation of:

$$S1(B+b)-S1(B) \leq D, \text{ and}$$

$$S2(A-B-b) \leq E.$$

3. A wavelength selecting switch according to claim 1, wherein
   the lens is a micro lens having a double focus structure in which a radius of curvature of a lens surface corresponding to the first region, and a radius of curvature of a lens surface corresponding to the second region, are different.

4. A wavelength selecting switch according to claim 1, wherein
   the lens is a micro lens having a double focus structure in which a refractive index of a lens part corresponding to the first region, and a refractive index of a lens part corresponding to the second region, are different.

5. A wavelength selecting switch according to claim 1, wherein
   the lens is a Fresnel lens having a double focus structure in which a shape or groove interval of a sawtooth wave-type groove corresponding to the first region, and a shape or groove interval of a sawtooth wave-type groove corresponding to the second region, are different.

6. A wavelength selecting switch according to claim 1, wherein in the lens, the focal lengths of the second region are superimposed.

7. A wavelength selecting switch according to claim 6, wherein the lens is a micro lens having a multiple focus structure in which a radius of curvature of a lens surface corresponding to the second region changes two or more times.

8. A wavelength selecting switch according to claim 7, wherein in the lens, the lens surface corresponding to the second region is a free-form surface.

9. A wavelength selecting switch according to claim 6, wherein
   the lens is a micro lens having a multiple focus structure in which a refractive index of a lens part corresponding to the second region changes two or more times.

10. A wavelength selecting switch according to claim 9, wherein in the lens, the refractive index of the lens part corresponding to the second region changes continuously.

11. A wavelength selecting switch according to claim 6, wherein the lens is a Fresnel lens having a multiple focus structure in which a shape or groove interval of a sawtooth wave-type groove corresponding to the second region changes two or more times.

12. A wavelength selecting switch according to claim 11, wherein in the lens, the shape or groove interval of the sawtooth wave-type groove corresponding to the second region changes continuously.

13. A wavelength selecting switch according to any one of claim 1 through claim 12, wherein the control section changes the angle of the respective reflecting mirrors from the optimum coupled state to the first direction.

\* \* \* \* \*